(12) United States Patent
Okano et al.

(10) Patent No.: US 8,865,994 B2
(45) Date of Patent: Oct. 21, 2014

(54) ELECTRONIC MUSIC SYSTEM

(75) Inventors: Tadashi Okano, Hamamatsu (JP); Toru Kitayama, Hamamatsu (JP)

(73) Assignee: Yamaha Corporation (JP)

( * ) Notice: Subject to any disclaimer, the term of this patent is extended or adjusted under 35 U.S.C. 154(b) by 715 days.

(21) Appl. No.: 12/323,020

(22) Filed: Nov. 25, 2008

(65) Prior Publication Data

US 2009/0133567 A1  May 28, 2009

(30) Foreign Application Priority Data

Nov. 28, 2007  (JP) .................................. 2007-308101

(51) Int. Cl.
*G10H 7/00* (2006.01)
*G10H 1/00* (2006.01)

(52) U.S. Cl.
CPC .................................. *G10H 1/0066* (2013.01)
USPC .................... 84/645; 84/609; 84/615; 84/649; 84/653

(58) Field of Classification Search
None
See application file for complete search history.

(56) References Cited

U.S. PATENT DOCUMENTS

| | | | | |
|---|---|---|---|---|
| 5,608,807 | A * | 3/1997 | Brunelle ........................ | 381/119 |
| 6,232,541 | B1 * | 5/2001 | Kumagai ......................... | 84/645 |
| 6,600,098 | B2 * | 7/2003 | Mizuno et al. .................. | 84/622 |
| 7,094,962 | B2 * | 8/2006 | Kayama .......................... | 84/609 |
| 7,254,540 | B2 * | 8/2007 | Fay et al. ....................... | 704/270 |
| 7,305,273 | B2 * | 12/2007 | Fay et al. ........................ | 700/94 |
| 7,531,737 | B2 * | 5/2009 | Ide et al. ......................... | 84/645 |
| 7,554,026 | B2 * | 6/2009 | de Moraes ...................... | 84/615 |
| 7,678,985 | B2 * | 3/2010 | Adams et al. ................... | 84/645 |
| 7,795,524 | B2 * | 9/2010 | Arai et al. ....................... | 84/612 |
| 7,868,241 | B2 * | 1/2011 | Mizuhiki et al. ................ | 84/622 |
| 7,875,789 | B2 * | 1/2011 | Mizuhiki et al. ................ | 84/626 |
| 7,888,580 | B2 * | 2/2011 | Okano et al. .................... | 84/615 |
| 7,939,741 | B2 * | 5/2011 | Okano ............................. | 84/609 |
| 2002/0009205 | A1 * | 1/2002 | Mercs et al. ..................... | 381/119 |
| 2003/0066413 | A1 * | 4/2003 | Nishitani et al. ................ | 84/615 |
| 2003/0140769 | A1 * | 7/2003 | Davis et al. ..................... | 84/609 |
| 2005/0016364 | A1 * | 1/2005 | Kamiya .......................... | 84/627 |
| 2005/0066797 | A1 * | 3/2005 | Miyamoto et al. .............. | 84/615 |
| 2006/0065105 | A1 * | 3/2006 | Iketani et al. ................... | 84/609 |
| 2006/0254410 | A1 * | 11/2006 | Kojima ........................... | 84/602 |
| 2006/0272479 | A1 * | 12/2006 | Takatsuka et al. .............. | 84/461 |
| 2007/0227342 | A1 * | 10/2007 | Ide et al. ......................... | 84/645 |
| 2009/0019992 | A1 * | 1/2009 | Mizuhiki et al. ................ | 84/604 |
| 2009/0019993 | A1 * | 1/2009 | Mizuhiki et al. ................ | 84/604 |

(Continued)

OTHER PUBLICATIONS

Steinberg; "Cubase SX/SL Tettei Sousa Guide"; Ritto Music; Jul. 31, 2004; pp. 1-279; Japan. Cited in specification.

(Continued)

*Primary Examiner* — Marlon Fletcher
(74) *Attorney, Agent, or Firm* — Rossi, Kimms & McDowell LLP

(57) ABSTRACT

An electronic music system includes a computer which performs a sequencing function and a remote controller. The remote controller is provided with a start operator and a selection operator. In response to an instruction made by the start operator of the remote controller, the computer or the remote controller adds a new track on a sequencer configured on the computer. The computer or the remote controller then offers options of available different types of tone generators used for the track, and in accordance with a selection made by the selection operator in a state where the available different types of tone generators have been offered, assigns the selected type of tone generator to the track.

8 Claims, 8 Drawing Sheets

(56) References Cited

U.S. PATENT DOCUMENTS

| | | | |
|---|---|---|---|
| 2009/0031884 A1* | 2/2009 | Arai et al. | 84/609 |
| 2009/0133567 A1* | 5/2009 | Okano et al. | 84/609 |
| 2009/0145283 A1* | 6/2009 | Okano et al. | 84/609 |
| 2009/0145287 A1* | 6/2009 | Okano | 84/645 |
| 2010/0199832 A1* | 8/2010 | Mizuhiki et al. | 84/604 |
| 2011/0023690 A1* | 2/2011 | Wilson | 84/609 |

OTHER PUBLICATIONS

Yamaha; "Motif ES Owner's Manual"; Modular Synthesis Plug-in System; pp. 1-296; Japan.

* cited by examiner

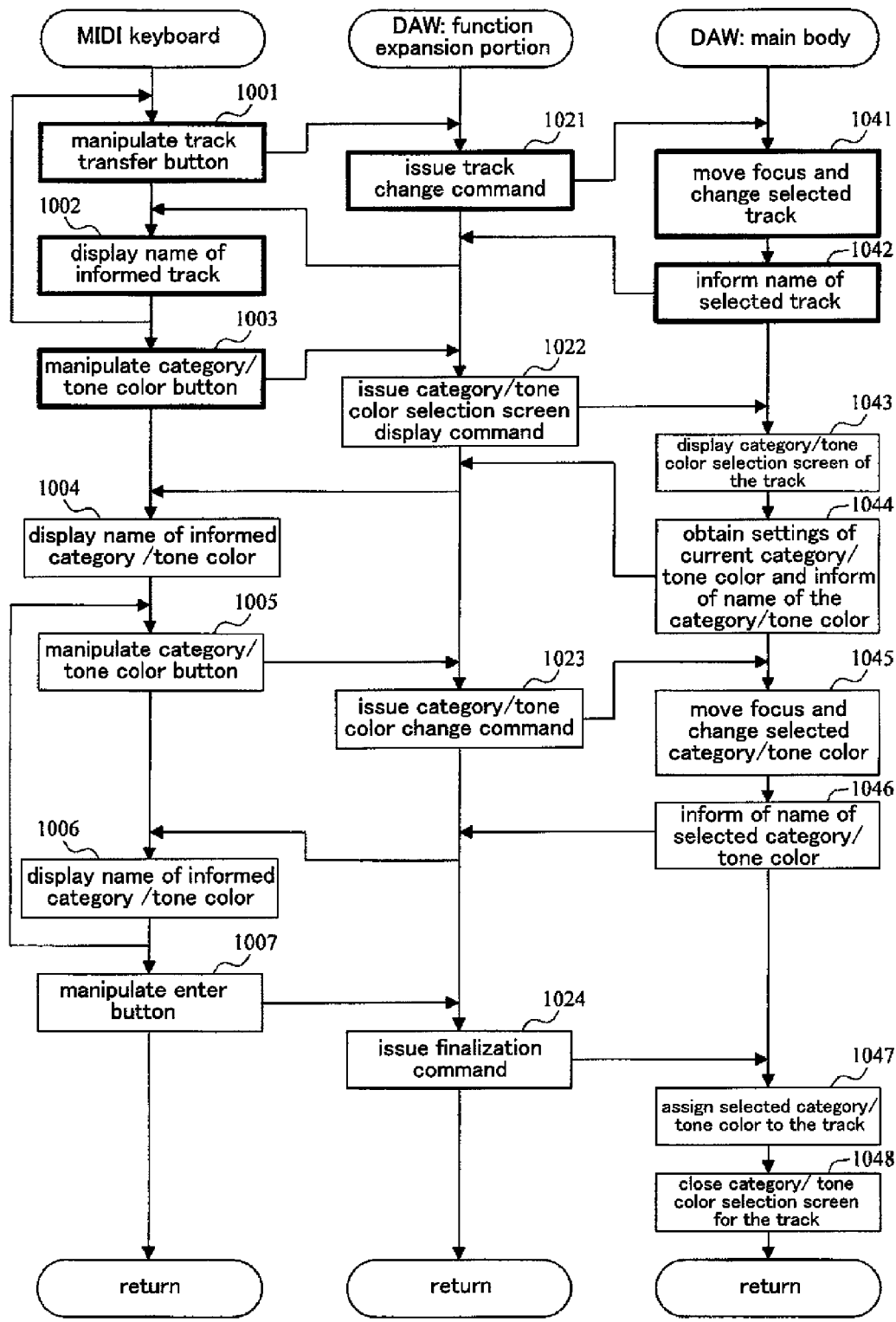

ELECTRONIC MUSIC SYSTEM

BACKGROUND OF THE INVENTION

1. Field of the Invention

The present invention relates to an electronic music system in which a computer on which music software has been installed is connected to a remote controller so that a user can control the music software through the use of the remote controller. The present invention also relates to a computer program.

2. Description of the Related Art

Conventionally, integrated music software which includes a MIDI sequencing function referred to as DAW (digital audio workstation) and music software having a single function of MIDI sequencer are known. By installing the conventional music software on a personal computer (PC) to execute the software, the PC can be used as an apparatus for creating music (for example, see *Cubase SX/SL Tettei Sousa Guide*: Ritto Music, Jul. 31, 2004.).

On the music creating apparatus realized by the conventional music software, generally, a user is to operate a pointing device such as a mouse and a character/numeric keyboard provided for the PC in order to create music. Furthermore, the user can connect the PC to a MIDI keyboard or the like so that the user can record his performance on the MIDI keyboard in real time. In addition, the user can control the music software by use of a multiplicity of switches and operators such as knobs and sliders provided on the MIDI keyboard and the like.

SUMMARY OF THE INVENTION

As described above, on the conventional music creating apparatus obtained by installing the music software which performs a MIDI sequencing function and the like on the PC, various operations such as adding a track in which musical tones are recorded/reproduced, assigning a software tone generator to the track, and assigning a tone color to the software tone generator are done by the user through the use of the pointing device such as a mouse and the character/numeric keyboard. Disadvantageously, when the user has to do a manipulation which requires the mouse and the like, the user has to leave the MIDI keyboard to face the PC to do the manipulation. Therefore, every manipulation which requires the user to sit in front of the PC disturbs the user's efforts to create music. Furthermore, although the series of operations such as "adding a track"→"assigning a software tone generator"→"assigning a tone color" are usually done in this order, each of these operations is independent, resulting in reduced efficiency. In addition, users who are not familiar with these operations tend to be puzzled about the procedure.

It is an object of the present invention to allow a user to control operations of the music software installed on a PC side without the need for leaving a MIDI keyboard when the user operates the music software including a MIDI sequencer. It is another object of the present invention to make it easy to perform a series of operations which are most likely to be done.

In order to achieve the above-described objects, an electronic music system according to the present invention has a computer which performs a sequencing function by executing music software and a remote controller connected to the computer. The remote controller has a plurality of setting operators for specifying a controlled status of a sequencer configured on the computer. The computer or the remote controller has a setting portion which specifies a controlled status brought about by the sequencing function in accordance with an operation of the setting operators.

In this case, for example, the computer employs a plurality of different types of tone generators for generating musical tones. The setting operators include a start operator for instructing start of a series of operations; and a tone generator selection operator for selecting any of the different types of tone generators. The setting portion has an addition portion which newly adds, in response to the instruction made by the start operator, a track which is a unit to record/reproduce a musical event by use of the sequencer configured on the computer; a tone generator offering portion which offers, after the addition of the track, options of available types of tone generators to be used for the added track; and a tone generator assigning portion which assigns, in accordance with the selection made by the tone generator selection operator in a state where the available different types of tone generators have been offered, a selected tone generator type to the track.

Furthermore, the setting operators include a start operator for instructing start of a series of operations and a selection operator for selecting a tone color. The setting portion has an addition portion which newly adds, in response to the instruction made by the start operator, a track which is a unit to record/reproduce a musical event by use of the sequencer configured on the computer; a tone color offering portion which offers, after the addition of the new track, options of available tone colors to be used for the newly added track; and a tone color assigning portion which assigns, in accordance with the selection made by the selection operator in a state where the available tone colors have been offered, a selected tone color to the track.

The present invention enables users to add a track, specify the type of tone generator, and specify a tone color through the use of the remote controller such as a MIDI keyboard, eliminating the need for interrupting their effort to create music on the MIDI keyboard side. In addition, the present invention improves efficiency in doing a series of operations, preventing the users from being puzzled about the procedure.

Furthermore, the present invention is not limited to the electronic music system but may be embodied as an invention of a method and an invention on a computer program applied for an electronic music system.

BRIEF DESCRIPTION OF THE DRAWINGS

FIG. 10 is a flowchart showing a processing procedure executed when a category/tone color of a track which has been already programmed is changed.

DESCRIPTION OF THE PREFERRED EMBODIMENT

Figure 1:
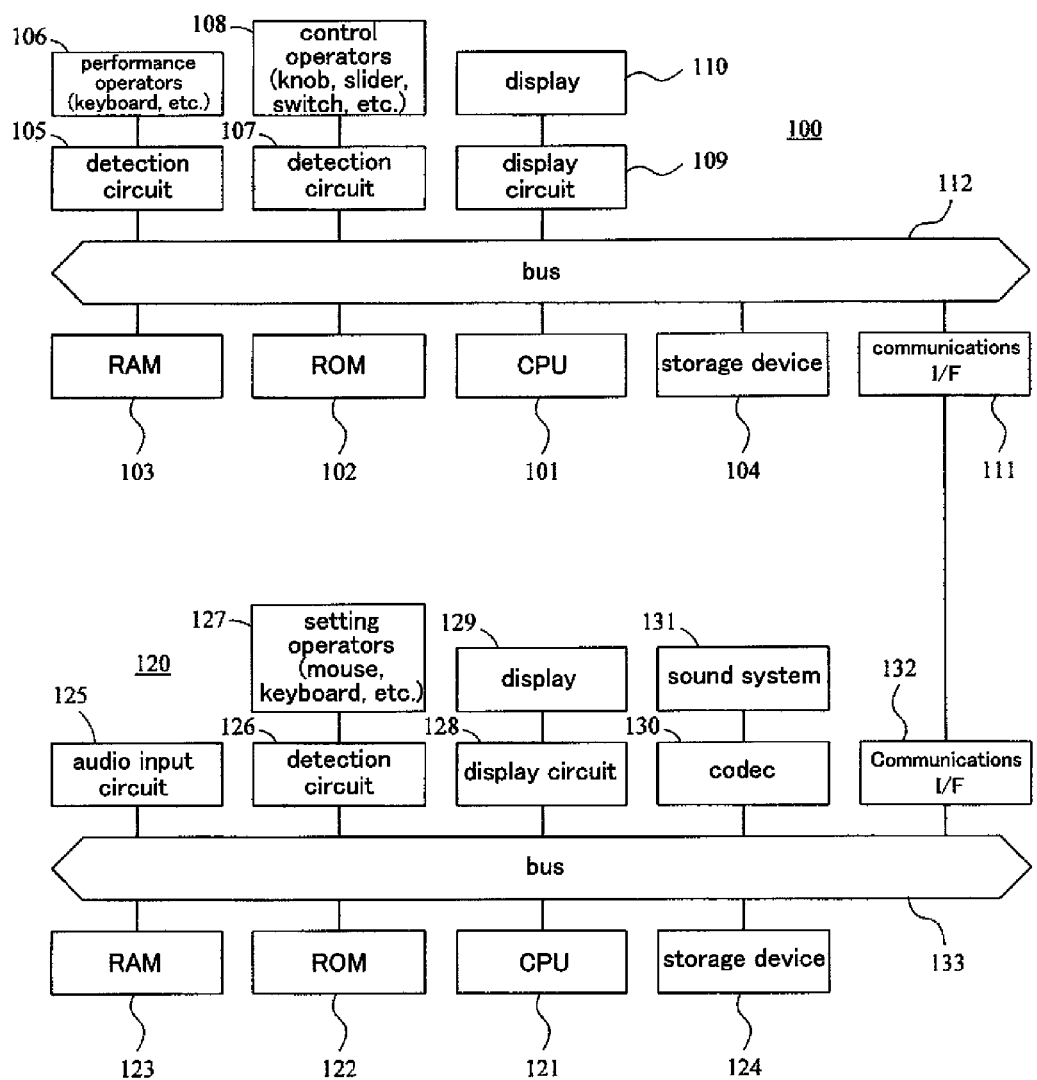
FIG. 1 is a block diagram showing a hardware configuration of an electronic music system according to an embodiment of the present invention.

An embodiment of the present invention will now be described with reference to the drawings. FIG. 1 is a block diagram showing a hardware configuration of an electronic music system to which the present invention is applied. This electronic music system has a music control apparatus 100 and an electronic music apparatus 120. In this embodiment, the music control apparatus 100 will be described as a MIDI keyboard. Hereafter, therefore, the music control apparatus 100 will be referred to as a MIDI keyboard 100. However, not only the MIDI keyboard but also any apparatuses can be adopted as the music control apparatus 100 as long as they can serve as a controller of the electronic music apparatus 120.

As for the MIDI keyboard 100, a CPU (central processing unit) 101 is a processing apparatus for controlling general operations of this MIDI keyboard. A ROM (read-only memory) 102 is a nonvolatile memory for storing control programs which the CPU 101 executes and various kinds of data. A RAM (random-access memory) 103 is a volatile memory used as a loading area for the programs executed by the CPU 101 and a working area. A storage device 104 is an external storage means for storing various kinds of information. The storage device 104 can be integrated into a main body of the MIDI keyboard. Alternatively, the storage device 104 can be formed of a detachable storage medium. Performance operators 106 are operators (in this embodiment, a keyboard) with which a user plays music. User's operations of the performance operators 106 are detected by a detection circuit 105. Detected results are transmitted to the CPU 101. Control operators 108 includes various operators such as knobs, sliders and switches provided on an external panel of the MIDI keyboard 100 and the like. User's operations of the control operators 108 are detected by a detection circuit 107. Detected results are transmitted to the CPU 101. A display 110 is a display apparatus for displaying various kinds of information. A display circuit 109 displays received data on the display 110 in accordance with instructions given by the CPU 101. A communications interface (I/F) 111 is an interface for connecting the MIDI keyboard with the electronic music apparatus 120. A bus 112 is a bus line for interconnecting the above-described constituent elements.

In this embodiment, the electronic music apparatus 120 is a PC onto which DAW software has been installed. By executing the DAW software, the electronic music apparatus 120 realizes various functions necessary to create music. The various functions include a hard disk recording function, a function of generating and editing MIDI data and audio data, a mixing function, and a sequencing function, for example. Hereafter, the electronic music apparatus 120 will be referred to as a DAW 120. Although the electronic music apparatus 120 is formed of a PC and the DAW software in this embodiment, the electronic music apparatus 120 can be a separate sequencer apparatus or the like.

As for the DAW 120, a CPU 121, a ROM 122, a RAM 123, a storage device 124, a detection circuit 126, setting operators 127 such as a mouse and a keyboard, a display circuit 128, and a display 129 are included in a general-purpose PC as a basic configuration. A communications I/F 132 is an interface for connecting the DAW 120 with the MIDI keyboard 100. The communications I/Fs 111 and 132 are one or more interfaces such as a wired I/F designed specifically for music such as MIDI, a general short-distance wired I/F such as USB and IEEE 1394, a general network I/F such as Ethernet (trademark), and a general short-distance wireless I/F such as wireless LAN and Bluetooth (trademark).

An audio input circuit 125 is a circuit for converting input analog acoustic signals to digital signals to output the converted digital signals or inputting digital acoustic signals to directly output the digital acoustic signals. A codec 130 is a sound I/O equipped with a digital/analog (D/A) converting function and the like. A sound system 131 emits tones on the basis of analog acoustic signals received from the codec 130. The audio input circuit 125, the codec 130, and the sound system 131 are functions realized by inserting a board and a card into slots of the PC which configures the DAW 120. A bus 133 is a bus line for interconnecting the above-described constituent elements.

Figure 2:
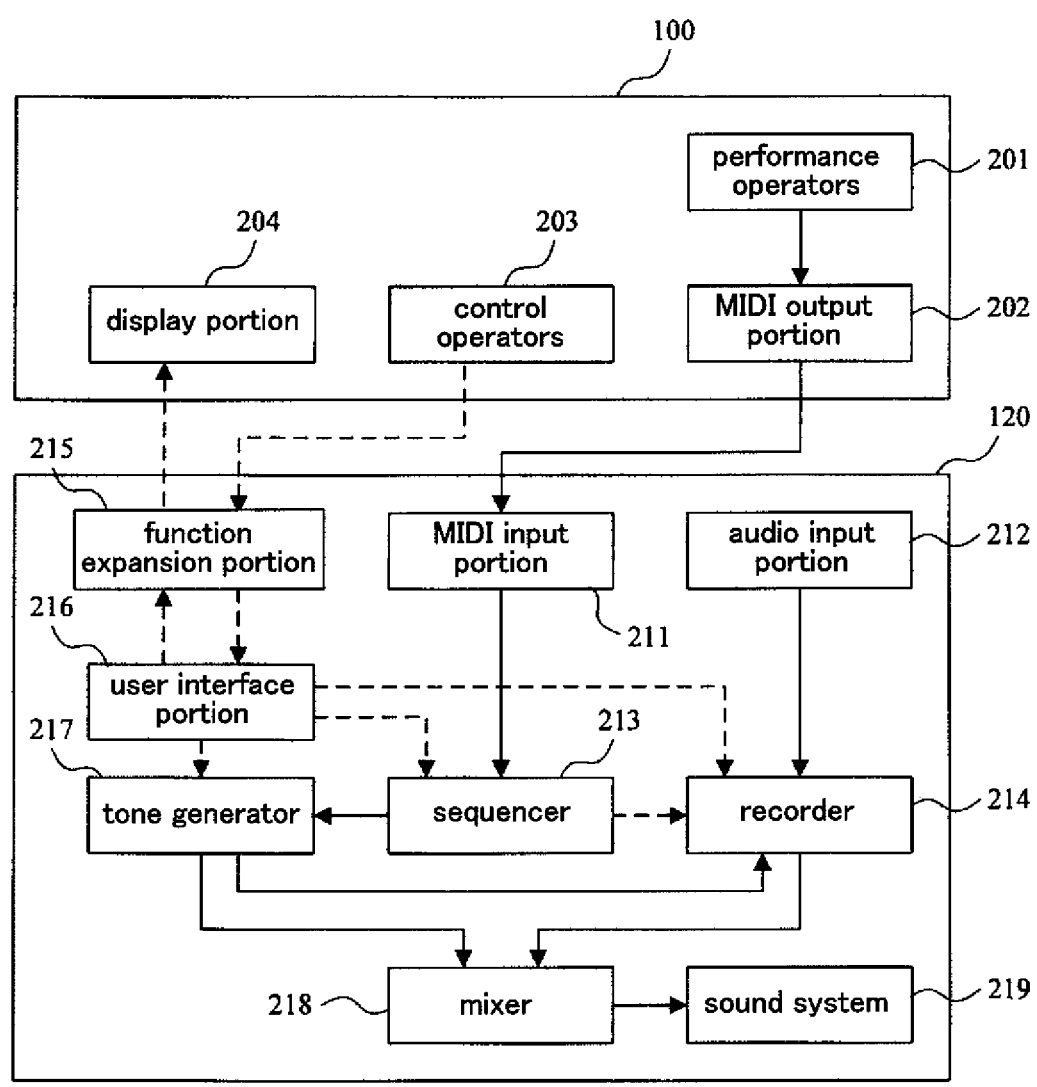
FIG. 2 is a functional block diagram of the electronic music system shown in FIG. 1.

FIG. 2 is a functional block diagram of the electronic music system shown in FIG. 1. A MIDI output portion 202 outputs MIDI note events in accordance with user's operations of performance operators 201 (106 of FIG. 1). The MIDI output portion 202 is realized by execution of certain software by the CPU 101 of FIG. 1. If control operators 203 (108 of FIG. 1) provided on the MIDI keyboard 100 are operated, control signals based on the operation are output to a function expansion portion 215 of the DAW 120. Information output from the function expansion portion 215 of the DAW120 is displayed on a display portion 204 (110 of FIG. 1) of the MIDI keyboard 100.

As for the DAW 120 shown in FIG. 2, an audio input portion 212 corresponds to the audio input circuit 125 shown in FIG. 1, while a sound system 219 corresponds to the codec 130 and the sound system 131 shown in FIG. 1. Other portions are realized by execution of the DAW software by the CPU 121. A MIDI input portion 211 inputs MIDI note events transmitted from the MIDI keyboard 100. The input MIDI note events can be stored in a sequencer 213. The MIDI note events stored in the sequencer 213 are supplied to a tone generator 217 in accordance with instructions for reproduction. In a case where a setting of "MIDI through" has been made on the sequencer 213, the input note events are to be directly supplied to the tone generator 217 as well. The tone generator 217, which is a software tone generator, includes various kinds of tone generators (various algorithms, various manufacturers, etc.). The tone generator 217 generates audio signals in accordance with the input note events. Audio signals output from the tone generator 217 are input to a recorder 214 and a mixer 218. The recorder 214 is capable of recording audio signals input by the audio input portion 212 and audio signals output from the tone generator 217. The audio signals recorded in the recorder 214 are output to the mixer 218 in accordance with instructions for reproduction. The mixer 218 mixes audio signals output from the tone generator 217 and the recorder 214 and then supplies the mixed audio signals to the sound system 219. The sequencer 213 is capable of synchronizing with the recorder 214 to reproduce audio signals.

The above-described portions (portions except the function expansion portion 215) involved in the functions of inputting MIDI signals and audio signals, storing (recording) the input signals, and then reproducing the signals are referred to as "DAW main body". The function expansion portion 215, which is a program which operates as a task separated from the DAW main body (the DAW main body is also formed of a several tasks), expands functions of the DAW. The function expansion portion 215 receives operational information (e.g., which type of operators has been turned on) transmitted in accordance with user's operation of the control operators 203 of the MIDI keyboard 100, converts the received operational information into a DAW control command, and then supplies the command to a user interface portion 216 of the DAW main body. The user interface portion 216 realizes GUI capability on the DAW 120. In a case as well where the user interface portion 216 receives the DAW control command from the function expansion portion 215, the user interface portion 216 transmits a control command corresponding to the received DAW control command to the respective portions of the DAW. The GUI capability includes capabilities of displaying various kinds of information on the display 129, detecting user's operation of the setting operators 127, and transmitting a control command corresponding to the user's operation to the respective portions of the DAW, for example. Such a configuration enables remote control of various functions of the DAW 120 from the MIDI keyboard 100.

In addition, various statuses of the DAW 120 (currently selected track, type of tone generator programmed for the track, tone color selected for the type of tone color, etc.) are displayed on the display 129 by the user interface portion 216. However, these statuses may be transmitted to the MIDI keyboard 100 side through the function expansion portion 215. The MIDI keyboard 100 which has received the notification about the statuses can display the various setting statuses on the display portion 204. Signals may be transmitted and received between the MIDI keyboard 100 and the function expansion portion 215 of the DAW 120 in accordance with a MIDI protocol. Alternatively, the transmission and reception may be conducted in accordance with a protocol designed specifically for something other than MIDI. In this embodiment, the transmission and reception is done in accordance with a protocol designed specifically for something other than MIDI.

Figure 3:
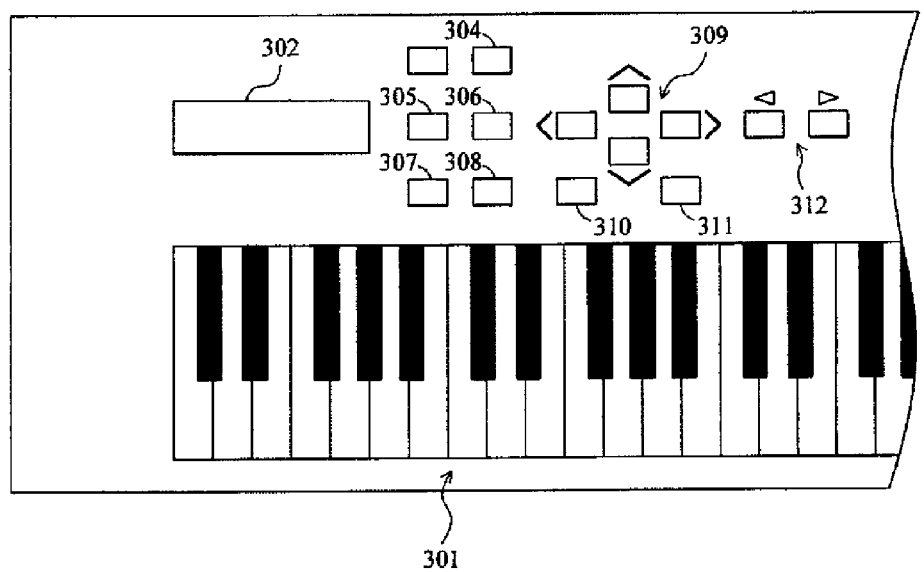
FIG. 3 is an external view of an external panel of a MIDI keyboard.

FIG. 3 is an external view of the external panel of the MIDI keyboard 100. The MIDI keyboard 100 has a keyboard 301 and a display 302 which displays various kinds of information. The MIDI keyboard 100 also has a new track addition button 304, category INC and DEC buttons (together referred to as category buttons) 305, 306, tone color INC and DEC buttons (together referred to as tone color buttons) 307, 308, vertical and lateral cursor movement buttons 309, an ESC (escape) button 310, an enter button 311 and track transfer buttons 312.

Similarly to conventional systems, the system of this embodiment allows a user to add a new track (1), assign a type of tone generator to the track (2), and assign a tone color to the track (3) by use of the setting operators 127 such as the mouse and the keyboard on the DAW 120 side. In addition, the system of this embodiment also allows a user to make the above-described series of settings (1) to (3) by use of the control operators 108 of the MIDI keyboard 100 side without using the setting operators 127 of the DAW 120. Hereafter, operations and example screens of this case will be described.

Figure 4:
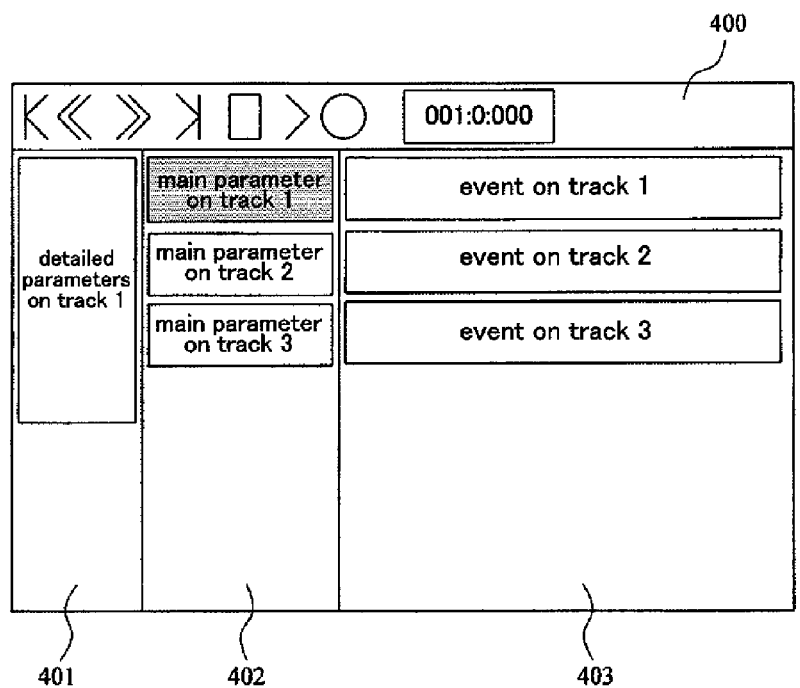
FIG. 4 is a diagram showing an example screen displayed in a state where tracks have been programmed.

FIG. 4 shows an example screen which displays a state where settings of tracks 1 to 3 have been already programmed. This screen is displayed on the display 129 of the DAW 120. At the top of the screen, a transport window 400 is displayed which displays a play position, reproduction control buttons and so on. On the left side, a track detail window 401 is displayed which displays detailed parameters on a selected track. In the middle of this screen, a track list window 402 is displayed. The track list window 402 displays a track list in which a selected track is focused (shaded in the figure). The user is allowed to select a track by use of the mouse or the like of the DAW 120 or by the track transfer buttons 312 of the MIDI keyboard 100. On the right side, an event window 403 is displayed which displays MIDI events stored in the respective tracks.

Figure 5:
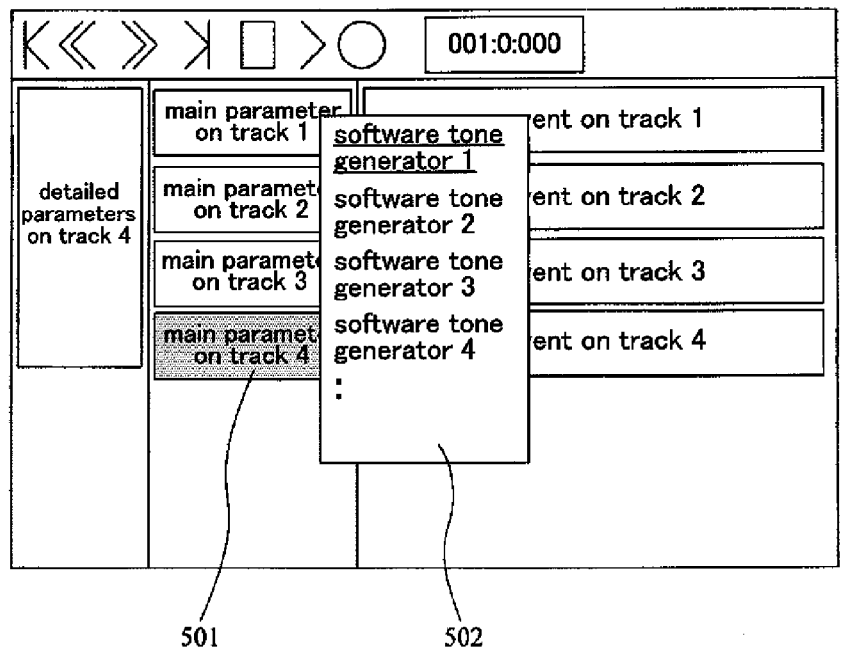
FIGS. 5 is a diagram showing a state where a new track has been added and a tone generator type selection screen (window) has been displayed.

FIG. 5 shows a state where a new track has been added to the state of FIG. 4 and a screen (window) for selecting a type of tone generator has been displayed. If the user depresses the new track addition button 304 in the state of FIG. 4, the screen will be refreshed to show the screen of FIG. 5. Basically, a new track is to be inserted so as to be placed next to the last listed track. In a case where there are vacant tracks among the listed tracks, a new track may be inserted so as to fill the vacant track which has the lowest track number. In FIG. 4, track 4 is added in a track list window 501. In a state immediately following the addition of the new track, the added track is focused to indicate that the track has been selected (501). Furthermore, a tone generator type selection screen 502 for selecting a type of tone generator for the newly added track 4 is automatically popped up to show a list of various available tone generators. On the tone generator type selection screen 502, "software tone generator 1" is focused (a cursor is placed) as an initial setting. The user is to operate the cursor movement keys 309 of the MIDI keyboard 100 to move the focus on the tone generator type selection screen 502 to select his desired type of tone generator to depress the enter button 311 to finalize the selection.

Figure 6:
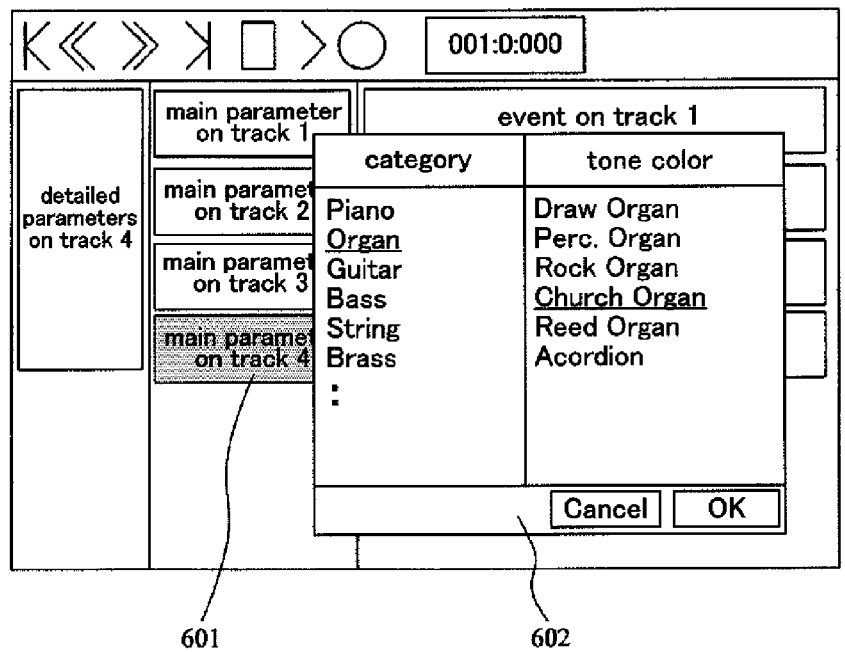
FIG. 6 is a diagram showing a state where a desired software tone generator has been selected and an enter button has been depressed.

FIG. 6 shows a state where a desired software tone generator has been selected in the state of FIG. 5 and the enter button 311 has been depressed. In FIG. 6, a category/tone color selection screen (window) 602 provided for the selected software tone generator is automatically popped up. The category/tone color selection screen 602 has a category list on the left side and a tone color list on the right side. The category list displays a category list of tone colors which the selected software tone generator can offer. In the category list, a default category ("organ" in the case of FIG. 6) is focused as an initial setting. The user can move the focus by operating the category buttons 305, 306 of the MIDI keyboard 100. On the tone color list provided on the right side, a list of tone colors belonging to the focused category is displayed. In the tone color list, a default tone color ("Church Organ" in the case of FIG. 6) is focused as an initial setting. The user can move the focus by operating the tone color buttons 307, 308 of the MIDI keyboard 100. By the user's manipulation of focusing a desired category and a desired tone color and depressing the enter button 311, the desired tone color is assigned to the newly added track. If the ESC button 310 is depressed, the category/tone color selection screen 602 disappears to return to the tone generator type selection screen of FIG. 5. If the ESC button 310 is depressed in the state of FIG. 5, furthermore, the addition of a new track is canceled to delete track 4 to return to the state of FIG. 4.

In this embodiment, as described above, the user is allowed to carry out a series of processes from the addition of a new track to the assignment of a tone generator type and a tone color to the added track by use of the operators of the MIDI keyboard 100 side.

Figure 7:
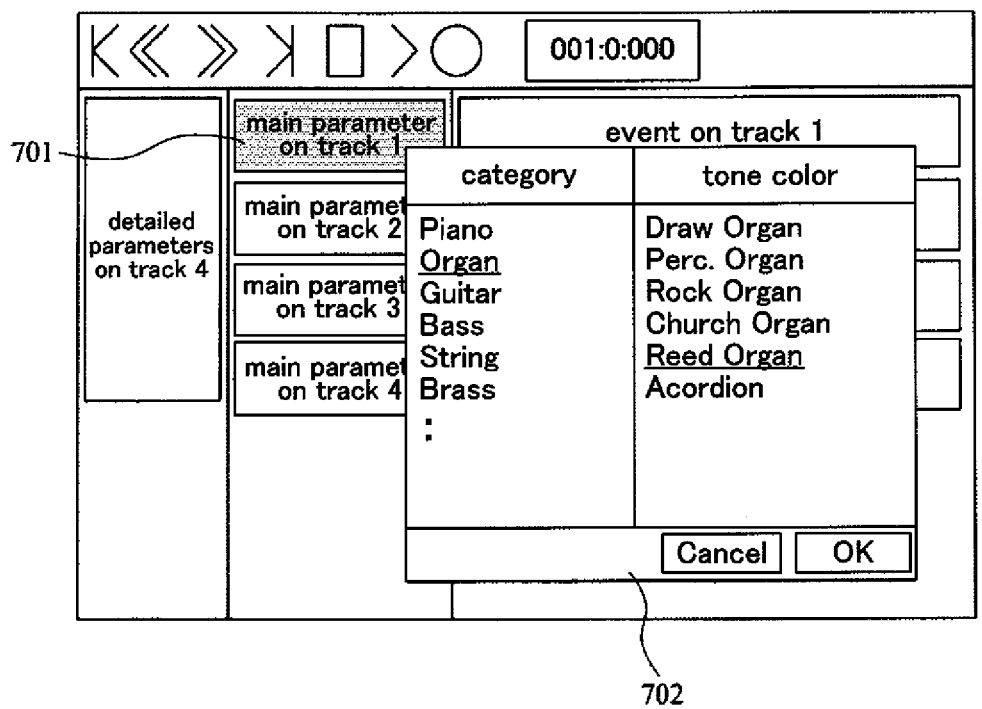
FIG. 7 is a diagram showing an example screen displayed when a tone color is to be changed.

Next, as for a track to which a tone generator type and a tone color have been already assigned, a procedure for changing the assigned tone color will be described. FIG. 7 shows a state where a desired track (in this case, track 1) whose tone color is desired to change has been selected from listed tracks 1 to 4 and any one of the category buttons 305, 306 or the tone color buttons 307, 308 has been depressed. The first depression of any of the buttons 305 to 308 in the state where a track has been selected corresponds to instructions to start a change to the tone color of the track. The first depression causes display of a category/tone color selection screen 702 for the selected track 1 (701). On the category/tone color selection screen 702, a currently selected category and a currently selected tone color of the track 1 are focused. As in the case of FIG. 6, the user is allowed to change the category and the tone color by manipulating the control operators 108 on the MIDI keyboard 100 side. A depression of any of the buttons 305 to 308 (i.e., second or later depression) on a state where the category/tone color selection screen 702 is displayed serves as instructions to move the focus on the category list or the tone color list, as explained with reference to FIG. 6.

Figure 8:
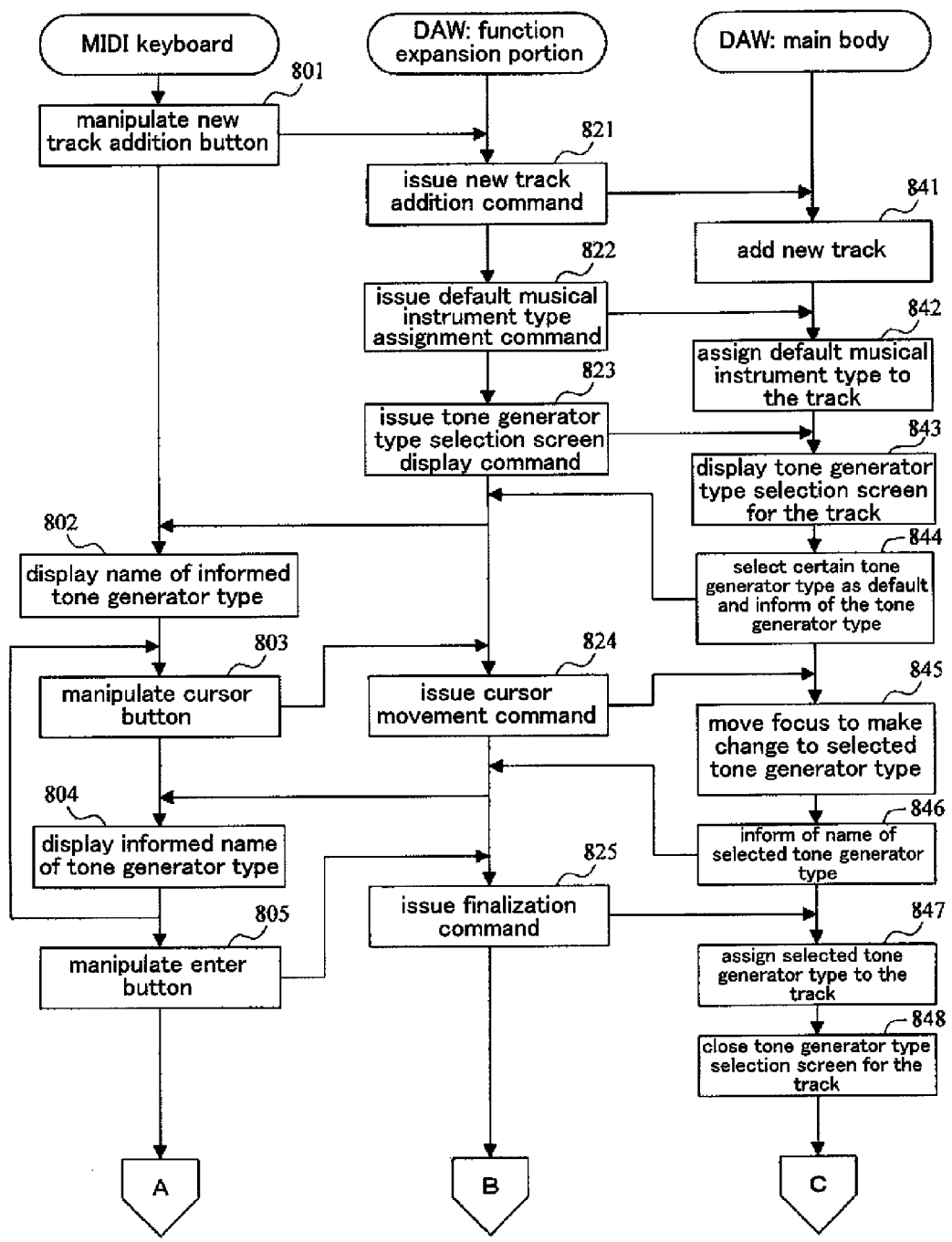
FIG. 8 is a flowchart showing the first half of a processing procedure executed when a new track is added.
Figure 9:
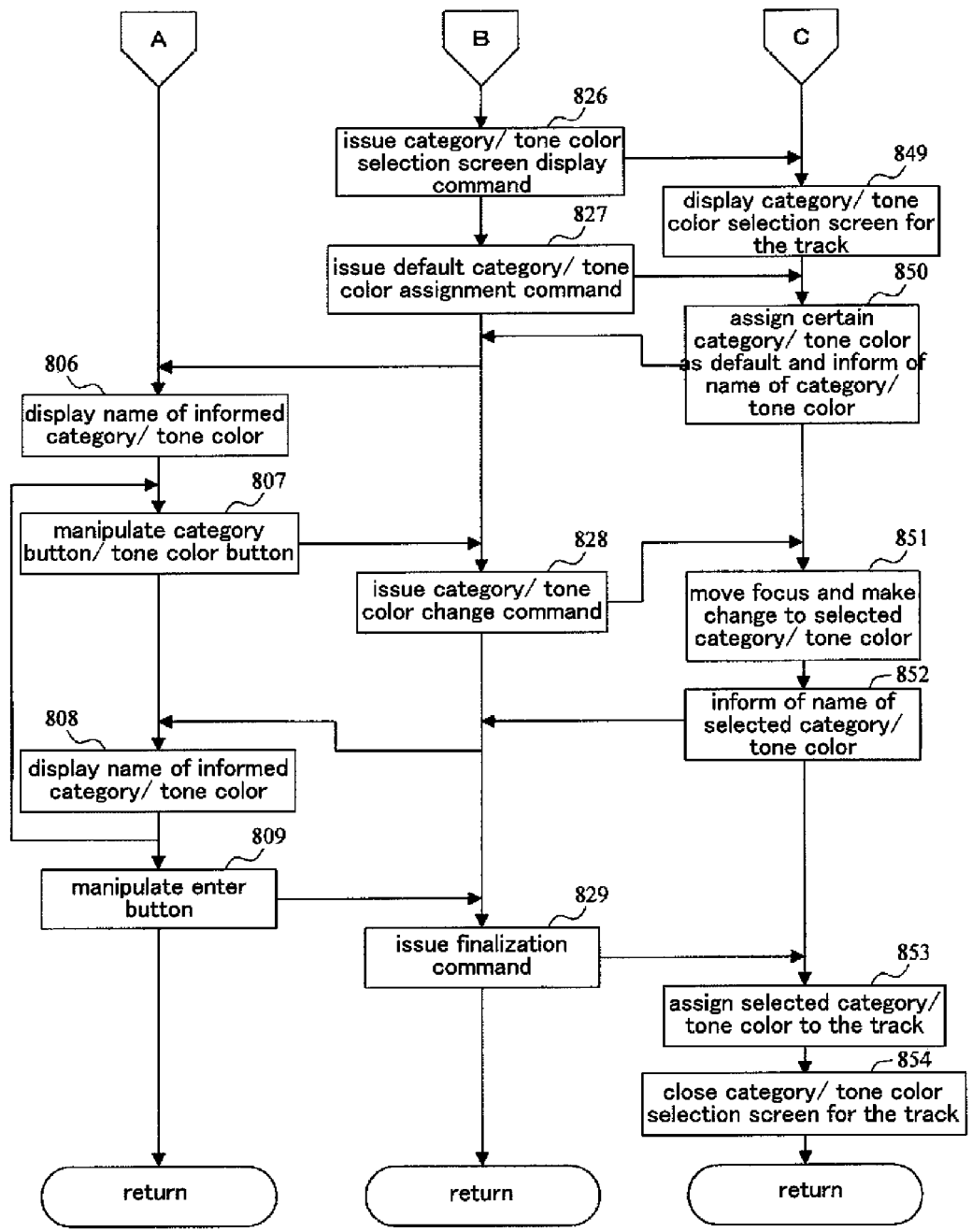
FIG. 9 is a flowchart showing the latter half of the processing procedure executed when a new track is added.

FIG. 8 and FIG. 9 are a procedure of the addition of a new track described with reference to FIGS. 4 to 6. If the new tack addition button 304 is depressed on the MIDI keyboard 100, the function expansion portion 215 of the DAW 120 is informed of the depressed button number (801). In response to the information, the function expansion portion 215 successively issues a new track addition command, a default musical instrument type assignment command and a tone generator type selection screen display command (821 to 823) to the DAW main body. The DAW main body carries out processing corresponding to the received commands (841 to 823), and informs the MIDI keyboard 100 of the name of a tone generator type (name of software tone generator) selected as a default (844). The MIDI keyboard 100 displays the informed name of the tone generator type (802). Step 842 is a process for assigning a default musical instrument type (software tone generator) to the added track for the moment.

After step 844, the display 129 of the DAW main body displays the tone generator type selection screen 502 described with reference to FIG. 5 with the tone generator type selected as a default being focused. If the user manipulates the cursor movement button 309 of the MIDI keyboard 100, the manipulation information is transmitted to the function expansion portion 215 (803). The function expansion portion 215 issues a cursor movement command corresponding to the received manipulation information to the DAW main body (824). In accordance with the command, the DAW main body moves the focus (cursor) on the tone generator type selection screen 502, makes a change to the selected tone generator type, and informs the MIDI keyboard 100 of the name of the changed tone generator type (846). These steps allow display of the name of the currently selected tone generator type on the MIDI keyboard 100 (804). If repetitions of these steps are finally followed by a depression of the enter button 311 to finalize the selection of the tone generator type, the function expansion portion 215 issues a finalization command to the DAW main body. The DAW main body assigns the selected tone generator type to the added track to close the tone generator type selection screen 502 (847, 848).

The function expansion portion 215 then issues a category/tone color selection screen display command and a default category/tone color assignment command successively (826, 827). In response to these commands, the DAW main body displays the category/tone color selection screen 602 described with reference to FIG. 6 (849), assigns a default category/tone color to the selected software tone generator (the default category/tone color are focused on the screen 602), and informs the MIDI keyboard 100 of the category/tone color (849, 850). The MIDI keyboard 100 displays the name of the informed category/tone color (806). If the user manipulates any of the category buttons 305, 306 and the tone color buttons 307, 308 of the MIDI keyboard 100, the information on the manipulation is transmitted to the function expansion portion 215 (807). In response to the information, the function expansion portion 215 issues a category/tone color change command corresponding to the manipulation information to the DAW main body (828). In accordance with the command, the DAW main body moves the focus (cursor) on the category/tone color selection screen 602 to make a change to the currently selected category/tone color to inform the MIDI keyboard 100 of the name of the category/tone color (852). These steps allow display of the name of the currently selected category/tone color on the MIDI keyboard 100 (808). If repetitions of these steps are finally followed by a depression of the enter button 311 to finalize the selection of the category and tone color, the function expansion portion 215 issues a finalization command to the DAW main body. The DAW main body then assigns the selected category and tone color to the added track to close the category/tone color selection screen 602 (853, 854).

In step 842, in addition to the assignment of a default software tone generator, a default category and tone color may be assigned so that the default category and tone color are set for the software tone generator. In step 845, at each move of the focus, a focused software tone generator may have a default category and a default tone color. Such assignments of default category and tone color ensure, even before the finalization of the selection of a category and tone color, that user's manipulation of the keyboard 106 of the MIDI keyboard 100 results in emission of tones having a tone color assigned to the tone generator selected at the moment. Furthermore, step 851 may allow each move of the focus to cause assignment of the focused category/tone color to the selected software tone generator. Such assignments ensure, even before the finalization of the selection of a category and tone color, that user's manipulation of the keyboard 106 of the MIDI keyboard 100 results in emission of tones having a tone color focused at the moment. The defaults may be previously specified. Alternatively, users may be allowed to optionally specify the defaults.

FIG. 10 is a procedure of changing a category/tone color of an already programmed track described with reference to FIG. 7. If the track transfer button 312 is manipulated on the MIDI keyboard 100, the manipulation information is transmitted to the function expansion portion 215 (1001). The function expansion portion 215 issues a track change command corresponding to the manipulation information to the DAW main body (1021). The DAW main body moves the focus in accordance with the command on the track list window 402 as shown in FIG. 4, for example, changes the selected track, and informs the MIDI keyboard 100 of the track name (1041, 1042). These steps allow the MIDI keyboard 100 to display the name of the selected track (1002). If these steps are repeated to turn a desired track to a selected state, and the user depresses any of the category buttons 305, 306 and the tone color buttons 307, 308, the depression information is transmitted to the function expansion portion 215 (1003). The function expansion portion 215 interprets the depression as instructions to start changing the tone color of the track, and issues a category/tone color selection screen display command to the DAW main body (1022). The selection of a track may be done on the DAW side, i.e., by use of operators of the PC.

As for the later processes, steps 1004 to 1007 are identical with steps 806 to 809 shown in FIG. 9. Steps 1022 to 1024 are identical with steps 826, 828, 829 shown in FIG. 9. Steps 1043 to 1048 are identical with steps 849 to 854 shown in FIG. 9. In step 1044, however, the DAW main body obtains the settings of the current category and tone color of the track to focus the obtained category and tone color on the category/tone color selection screen.

Although the above-described embodiment employs the software tone generators, hardware tone generators may be employed. Furthermore, the embodiment may employ both software tone generators and hardware tone generators. In this case, software tone generators and hardware tone generators may be separately provided so that the user can discern between the software tone generators and the hardware tone generators. Alternatively, software tone generators and hardware tone generators may be listed together so that the user can select his desired tone generator without discerning between software and hardware.

Although the above-described embodiment shows an example which employs general purpose cursor buttons as operators for selecting a tone generator type, operators such as buttons designed specifically for selecting a tone generator type may be employed Although the above-described embodiment allows users to select a tone color type in two tiers of "category+tone color", the selection may be made in other schemes. For example, the selection of a tone color type may be made in three tiers of "category+subcategory+tone color" or in one tier of tone color only. As for the operators for selecting a tone color, the above-described embodiment employs an example of specifically designed category buttons and specifically designed tone color buttons. In addition to the specifically designed buttons, the embodiment may also allow the user to select a tone color by use of general purpose operators such as cursor buttons.

Although the above-described embodiment is designed to have the function expansion portion on the DAW side, the function expansion portion may be incorporated in the MIDI keyboard. In this case, a series of operations are to be managed by the MIDI keyboard side. More specifically, the MIDI keyboard transmits various kinds of instructions such as "addition of a new track", "display of tone generator selection screen", and "display of tone color selection screen" to the DAW software. Furthermore, the DAW main body may have functions equivalent to the function expansion portion. The remote controller is not limited to the MIDI keyboard but may be formed of a control table having only knobs, faders and switches (or with a display) or any other configurations.

Although the above-described embodiment was described with reference to the example of a series of procedures of addition of a track, selection of a software tone generator and selection of tone color of the software tone generator, the embodiment may be modified such that the addition of a track is followed only by the selection of a software tone generator. Alternatively, in a case where there is only one type of tone generator available, the addition of a track may be followed only by the selection of a tone color. Furthermore, although the above-described embodiment was described as a case where the DAW is controlled by use of the control operators of the MIDI keyboard, it is taken for granted that the DAW may be controlled by use of the operators of the DAW side.

What is claimed is:

1. An electronic music system comprising:
a computer which performs a sequencing function via a sequencer by executing music software, the sequencer being configured on the computer; and
a remote controller physically separated from, but connected to the computer,
wherein the remote controller comprises a plurality of control operators for specifying a controlled status of the sequencer configured on the computer by transmitting operational information to the computer,
wherein the remote controller comprises performance operators operated by a user to supply performance information to the computer,
wherein the operational information changes settings of the music software, in contrast to the performance information, which represents a user's MIDI note events processed by the music software to generate audio signals, and wherein
the computer employs a plurality of different types of tone generators for generating musical tones;
the control operators include:
a start operator for instructing start of a series of operations; and
a tone generator selection operator for selecting any of the different types of tone generators; and
the remote controller further comprises:
an addition portion which newly adds, in response to the instruction made by the start operator, a track which is a unit to record/reproduce a musical event by use of the sequencer configured on the computer;
a tone generator offering portion which offers, after the addition of the track, options of available types of tone generators to be used for the added track; and
a tone generator assigning portion which assigns, in accordance with the selection made by the tone generator selection operator in a state where the available different types of tone generators have been offered, a selected tone generator type to the track.

2. An electronic music system according to claim 1, wherein the plurality of different types of tone generators are a plurality of different types of software tone generators.

3. An electronic music system according to claim 1, wherein
the control operators further comprise a tone color selection operator for selecting a tone color; and
the remote controller further comprises:
a tone color offering portion which offers options of available tone colors belonging to the selected type of tone generator; and
a tone color assigning portion which assigns, in accordance with the selection made by the tone color selection operator in a state where the available tone colors have been offered, a selected tone color to the track.

4. An electronic music system comprising:
a computer which performs a sequencing function via a sequencer by executing music software, the sequencer being configured on the computer; and
a remote controller physically separated from, but connected to the computer,
wherein the remote controller comprises a plurality of control operators for specifying a controlled status of the sequencer configured on the computer by transmitting operational information to the computer,
wherein the remote controller comprises performance operators operated by a user to supply performance information to the computer,
wherein the operational information changes settings of the music software, in contrast to the performance information, which represents a user's MIDI note events processed by the music software to generate audio signals, and wherein
the control operators comprise:
a start operator for instructing start of a series of operations; and
a selection operator for selecting a tone color; and
the remote controller further comprises:
an addition portion which newly adds, in response to the instruction made by the start operator, a track which is a unit to record/reproduce a musical event by use of the sequencer configured on the computer;

a tone color offering portion which offers, after the addition of the new track, options of available tone colors to be used for the newly added track; and a tone color assigning portion which assigns, in accordance with the selection made by the selection operator in a state where the available tone colors have been offered, a selected tone color to the track.

5. A non-transitory computer-readable storage medium storing a computer program for an electronic music system including a computer which performs a sequencing function via a sequencer configured on the computer by executing music software, and a remote controller connected to the computer, the computer program, when executed by a processing unit in the remote controller, causing the remote controller to perform a method comprising the steps of:

specifying, in accordance with an operation of a plurality of control operators provided on the remote controller in order to specify a controlled status brought about by the sequencing function, a controlled status of the sequencer configured on the computer by transmitting operational information to the computer; and supplying performance information from the remote controller to the computer in response to user operation of performance operators on the remote controller, wherein the operational information changes settings of the music software, in contrast to the performance information, which represents a user's MIDI note events processed by the music software to generate audio signals, and wherein the computer employs a plurality of different types of tone generators for generating musical tones;

the control operators include:

a start operator for instructing start of a series of operations; and a tone generator selection operator for selecting anyone of the different types of tone generators; and the step of specifying a controlled status of the sequencer comprises the steps of:

newly adding, in response to the instruction made by the start operator, a track which is a unit to record/reproduce a musical event by use of the sequencer configured on the computer;

offering, after the addition of the track, options of available types of tone generators to be used for the added track; and assigning, in accordance with the selection made by the tone generator selection operator in a state where the available different types of tone generators have been offered, a selected tone generator type to the track.

6. A non-transitory computer-readable storage medium according to claim 5, wherein the plurality of different types of tone generators are a plurality of different types of software tone generators.

7. A non-transitory computer-readable storage medium according to claim 5, wherein the control operators further comprise a tone color selection operator for selecting a tone color; and the step of specifying controlled status of the sequencer further comprises the steps of:

offering options of available tone colors belonging to the selected type of tone generator; and assigning, in accordance with the selection made by the tone color selection operator in a state where the available tone colors have been offered, a selected tone color to the track.

8. A non-transitory computer-readable storage medium storing a computer program for an electronic music system including a computer which performs a sequencing function via a sequencer configured on the computer by executing music software, and a remote controller connected to the computer, the computer program, when executed by a processing unit in the remote controller, causing the remote controller to perform a method comprising the steps of:

specifying, in accordance with an operation of a plurality of control operators provided on the remote controller in order to specify a controlled status brought about by the sequencing function, a controlled status of the sequencer configured on the computer by transmitting operational information to the computer; and supplying performance information from the remote controller to the computer in response to user operation of performance operators on the remote controller, wherein the operational information changes settings of the music software, in contrast to the performance information, which represents a user's MIDI note events processed by the music software to generate audio signals, and wherein the control operators comprise:

a start operator for instructing start of a series of operations; and a selection operator for selecting a tone color; and the step of specifying controlled status of the sequencer comprises the steps of:

newly adding, in response to the instruction made by the start operator, a track which is a unit to record/reproduce a musical event by use of the sequencer configured on the computer;

offering, after the addition of the new track, options of available tone colors to be used for the newly added track; and assigning, in accordance with the selection made by the selection operator in a state where the available tone colors have been offered, a selected tone color to the track.

* * * * *